United States Patent
Stults et al.

(10) Patent No.: US 8,585,100 B2
(45) Date of Patent: Nov. 19, 2013

(54) PRESS-CONNECT FITTING WITH IMPROVED GRAB RING FUNCTION

(75) Inventors: Ledford Samuel Stults, Mishawaka, IN (US); Dana F. Buccicone, Goshen, IN (US); Randall White, Bristol, IN (US)

(73) Assignee: Elkhart Products Corporation, Langbroek (NL)

( * ) Notice: Subject to any disclaimer, the term of this patent is extended or adjusted under 35 U.S.C. 154(b) by 0 days.

(21) Appl. No.: 12/818,942

(22) Filed: Jun. 18, 2010

(65) Prior Publication Data

US 2011/0049875 A1   Mar. 3, 2011

Related U.S. Application Data

(60) Provisional application No. 61/237,567, filed on Aug. 27, 2009.

(51) Int. Cl.
*F16L 13/14*   (2006.01)

(52) U.S. Cl.
USPC .............................................. 285/382; 29/508

(58) Field of Classification Search
USPC ........... 285/382, 382.2, 340, 256, 257, 382.1; 29/506, 508
See application file for complete search history.

(56) References Cited

U.S. PATENT DOCUMENTS

| | | | | | |
|---|---|---|---|---|---|
| 2,225,208 | A | * | 12/1940 | Crickmer | 285/382.7 |
| 3,915,480 | A | * | 10/1975 | Kish et al. | 285/382 |
| 4,466,640 | A | * | 8/1984 | Van Houtte | 285/382 |
| 4,850,096 | A | * | 7/1989 | Gotoh et al. | 285/382.7 |
| 4,880,260 | A | * | 11/1989 | Gotoh et al. | 285/382.2 |
| 5,029,908 | A | | 7/1991 | Belisaire | |
| 5,108,134 | A | * | 4/1992 | Irwin | 285/382.7 |
| 5,267,758 | A | * | 12/1993 | Shah et al. | 285/256 |
| 6,805,385 | B2 | * | 10/2004 | Viegener | 285/382.2 |
| 7,201,382 | B2 | * | 4/2007 | Viegener | 285/374 |
| 7,316,429 | B2 | | 1/2008 | Viegener | |
| 7,475,918 | B2 | * | 1/2009 | Kaimer et al. | 285/382.2 |
| 7,954,861 | B2 | * | 6/2011 | Swift et al. | 285/382.2 |

OTHER PUBLICATIONS

International Search Report and the Written Opinion issued for PCT/US2010/046446, dated Oct. 12, 2010, 8 pages.

* cited by examiner

*Primary Examiner* — David E Bochna
(74) *Attorney, Agent, or Firm* — Fulbright & Jaworski LLP

(57) ABSTRACT

A fitting assembly for joining two pipes. The fitting assembly includes a fitting having a recess in a distal end for receiving a pipe end. A sealing ring is in the recess to provide a fluid-tight seal after the fitting is pressed. Also, a grab-ring is in the recess having a continuous sharp inner edge to engage an outer surface of the pipe after the fitting is pressed.

15 Claims, 4 Drawing Sheets

US 8,585,100 B2

PRESS-CONNECT FITTING WITH IMPROVED GRAB RING FUNCTION

CROSS-REFERENCE TO RELATED APPLICATIONS

This Application claims the benefit of U.S. Provisional Application 61/237,567 filed on Aug. 27, 2009.

TECHNICAL FIELD

The concepts described herein involve press-connect pipe fittings. In particular this invention relates to an improved grab-ring design and associated functionality.

BACKGROUND OF THE INVENTION

U.S. Pat. Nos. 4,964,657, 7,316,429 and 7,201,382 and United States Patent Application No. 2003/0038481 describe press-connect plumbing fittings where multi-tooth grab-rings are used in addition to the pressed structural strength of the fitting. While the grab-ring does provide a portion of the pipe retention strength, there is also a component of the holding force caused by the intimate contact between the deformed fitting body and the tube.

BRIEF SUMMARY OF THE INVENTION

According to one aspect of the invention, a pipe fitting assembly includes a fitting having a recess in a distal end for receiving a pipe end. The fitting assembly also includes a sealing ring in the recess to provide a fluid-tight seal after the fitting is pressed. The fitting assembly further includes a grab-ring in the recess having a continuous sharp inner edge to engage an outer surface of the pipe after the fitting is pressed.

According to another aspect of the invention, a method of joining a first pipe and a second pipe using a fitting includes inserting a first pipe end into a fitting having a recess in a distal end, the fitting including a sealing ring in the recess and a grab-ring in the recess, the grab ring having a continuous sharp inner edge. The method also includes pressing the fitting such that the sealing ring provides a fluid-tight seal between an inner surface of the fitting and an outer surface of the pipe end and the continuous sharp inner edge of the grab-ring engages the outer surface of the pipe end, thereby securing the pipe end to the fitting.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
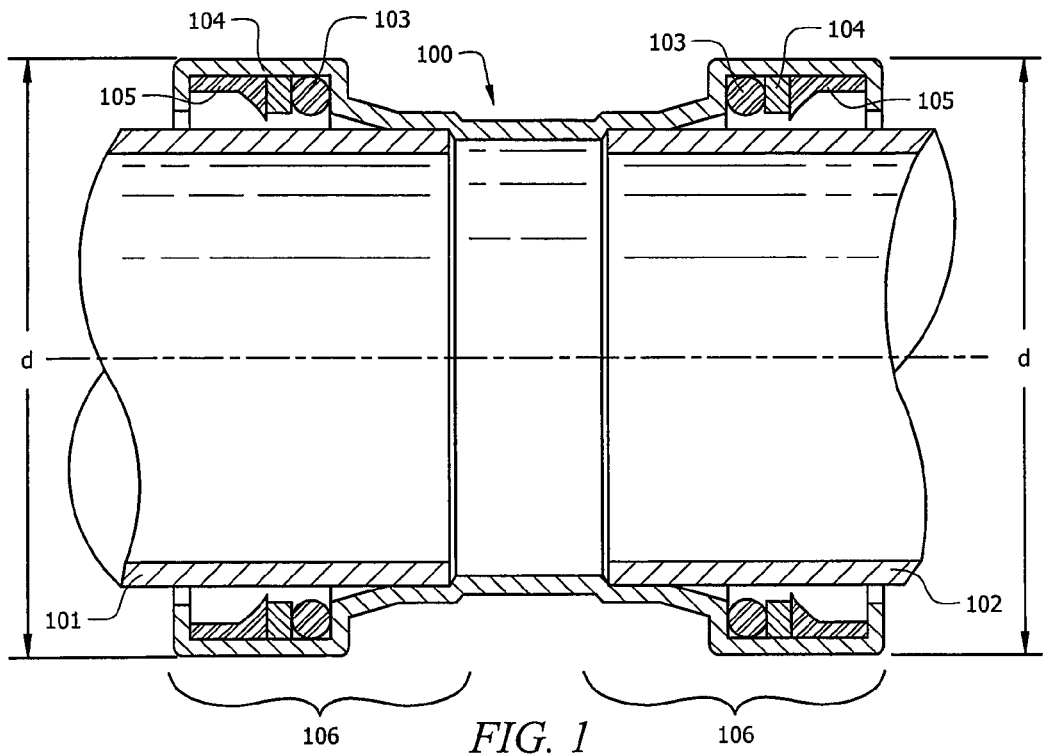
FIG. 1 is a cross-section of a fitting assembly in an unpressed condition with pipes in place in accordance with the concepts described herein.

The concepts described herein, and shown in FIGS. 1-5, involve press-connect fittings. A press-connect fitting is a fitting used particularly for the joining of pipes in plumbing systems that takes the form of an assembled unit that is used to join pipes/tubes where a separate tool is used to compress the fitting and pipe or tube into a leak proof and structurally capable joint. Embodiments of the fitting can include a sealing O-ring to create a water tight seal, a grab-ring, and a spacer ring between the sealing O-ring and grab-ring. These elements can be recessed into a receiving area formed in the end of a fitting joint. The spacer ring can be used to separate and protect the seal (O-ring) from the grab-ring during the pressing operation. In embodiments of the press-connect fitting according to concepts described herein, the grab-ring includes an internal sharp edged diameter and shape such that when pressed the grab-ring's outside diameter is reduced, resulting in the sharp edge imbedding into the pipe/tube surface. The grab-ring can also be referred to as press ring as shown in FIG. 1.

Embodiments of the design in accordance with the concepts described herein utilize the geometry of the grab-ring as the primary strength of the joint. The twisting moment of the grab-ring, which occurs when the pressed-fitting is placed in tension (pressure or mechanical force), is captured via the extended cross-section of the grab-ring being fully engaged with the inside surface of the fitting body, thus providing increased resistance to burst pressures, enhanced water hammer resistance, and minimal creep of the tube within the fitting under load. In addition, embodiments of the grab-ring design allow for efficient and effective pressing force to be applied directly through the grab-ring, thus gaining maximum penetration of the grab-ring into the tube. Effective grab-ring penetration provides the basis for the twisting moment when an axial force is applied. The twisting moment then translates to place the grab-ring outside diameter into intimate contact with the interior wall of the fitting. In certain embodiments, the geometry of the grab-ring provides an effective lever mechanism which reduces the load being transmitted to the fitting wall. In embodiments of the press-connect fitting according to the concepts described herein, the open end of the grab-ring is forced linearly into contact with the closed end of the fitting, thus creating the ability to transmit axial force into the fitting housing. This provides an improvement over existing press-connect fittings.

Particular embodiments include additional features with respect to the grab-ring design. In certain embodiments, the cross section design of the grab-ring is such that it counters any tendency of the grab-ring to rotate during axial loading, i.e. it will not roll or twist. This feature is further enhanced in that a continuous ring with a single gap and one continuous sharp edged tooth is used. Existing grab-rings use multiple teeth which may individually bend. Other embodiments describe a grab-ring where the cross section of the grab-ring has a tapered profile oriented toward the open end of the fitting. This profile guides the tube into the fitting during insertion and protects the O-ring/seal from being damaged by an improperly prepared tube end, i.e. a tube end with sharp burrs. In yet other embodiments, the continuous grab-ring edge that impales the tube, i.e. a single tooth, provides the means to insure the tube does not collapse during severe bending under field and lab test conditions need more detail here. The embodiments of the press-connect fitting designs described herein are intended to utilize pressing jaws presently available in the marketplace, thus eliminating the need for a special jaw.

Advantage of the concepts described herein include the solid uninterrupted grab-ring (i.e. one tooth) providing for a significant increase in contact with the tube after pressing. The physical shape of the embodiments of the grab-ring described herein provides a substantial improvement in pressing efficiency, with the grab-ring located directly under the jaws during the pressing operation. In addition, in certain embodiments, the shape of the grab-ring after pressing provides an enhanced arrangement which limits twisting of the grab-ring, this in turn creates an effective transmission of axial force into the fitting body due to the contact of the grab-ring with the interior fitting surface and the closed end of the fitting. These features create an improved press-connect fitting that does not currently exist in the industry.

FIG. 1 depicts an embodiment of fitting assembly 100 according to an aspect of the present invention. Fitting assembly 100 effectively seals a joint between pipe 101 and pipe 102. Fitting assembly 100 receives pipe 101 and pipe 102 to form the joint. To do so, fitting assembly 100 receives each of pipe 101 and pipe 102 at a first distal end and a second distal end, respectively, where pipe 101 and pipe 102 abut one another at a medial portion of assembly 100. As depicted in FIG. 1, fitting assembly 100 is shown as receiving pipe 101 and pipe 102 from directly opposing directions, so that a joint is formed where pipe 101 and pipe 102 are parallel to one another. However, according to other aspects of the present invention, fitting assembly 101 may be curvilinear, whereby, when received by fitting assembly 100, pipe 101 and pipe 102 form angles with respect to one another, most commonly 45 degree or 90 degree angles with respect to one another. According to other aspects, fitting assembly 100 may be a "T joint" whereby fitting assembly 100 joins three pipes, one pipe being at a right angle with respect to the other two. When being inserted into fitting assembly 100, pipe 101 and pipe 102 move in opposing directions (indicated by arrows) until they either abut one another or abut fitting assembly 100 along its medial section, perhaps at an area marked therein by a circumference being sufficiently small to prevent pipe 101 and pipe 102 from continuing to move in opposing directions. The medial section of pipe assembly 100 having an area to stop pipe 101 and pipe 102 therein is particularly useful in the case fitting assembly 100 is curvilinear, thereby joining pipe 101 and pipe 102 at angles with respect to one another.

At each of its distal or receiving ends, fitting assembly 100 has a greater unpressed bead diameter, d, of sufficient size to accept pipe 101 and pipe 102. When received by fitting assembly 100, the outer circumference of pipe 101 and pipe 102 contact the inner circumference of fitting assembly 100. Pipe 101 and pipe 102 typically comprise a copper or brass pipe as used in common plumbing applications. However, depending on the specific application, pipes 101 and 102 may comprise steel or other materials.

According to an aspect of the present invention, the receiving or distal ends of fitting assembly 100 comprise additional components, including O-ring 103, spacer 104, and grab-ring 105. O-ring 103, spacer 104, and grab-ring 105 are contained within an area generally designated as receiving area 106, which is characterized by a portion of enlarged circumference about the distal ends of fitting assembly 100 and shaped to effectively house O-ring 103, spacer 104, and grab-ring 105. As depicted in FIG. 1, receiving area 106 has a greater unpressed bead diameter, d. O-ring 103, spacer 104, and grab-ring 105 are recessed within receiving area 106. Receiving area 106 is generally defined by a flange located about the receiving end of pipe 101. That is, the circumference of fitting assembly 100 expands along its length in the direction of its receiving end, with receiving area 106 housing the aforementioned components. As will be apparent to those skilled in the art, the specific shape of receiving area 106 may vary according to specific applications.

O-ring 103 is located furthest from the distal or receiving end of fitting assembly 100 within receiving area 106; accordingly, O-ring 103 is located closest to the interface between pipe 101 and pipe 102. O-ring 103, according to a preferred embodiment, forms a loop and comprises an elliptical or disc-shaped cross-section. Further, O-ring 103 is preferably an elastomer capable of being compressed during actuation of components within receiving area 106 between an unpressed and pressed position, thereby creating a seal at the interface between fitting assembly 100 and pipe 101 and fitting assembly 100 and pipe 102. O-ring 103 can beneficially have different cross sections, e.g., circular, x-shaped, square, etc., and could be partially-seated within a groove of receiving area 106 and could further be aligned with a groove in pipe 101, and/or pipe 102, so that O-ring 103 becomes partially-seated within the groove(s) therein when in a pressed position.

During the pressing operation, the components within receiving area 106 are actuated from an unpressed to a pressed position. Advantageously, the configuration fitting assembly 100 allow it to be pressed with standard tools known in the art. A successful seal is formed about the joint between pipe 101 and pipe 102 whereby the pressing of fitting assembly 100 applies a predictable deformation to O-ring 103. This introduces a calculated mechanical stress between O-ring 103 and the surfaces of fitting assembly 100, pipe 101, and pipe 102. As long as the pressure of the fluid being contained does not exceed this stress, leaking cannot occur.

Spacer ring 104 is located between O-ring 103 and grab-ring 105 within receiving area 106. Spacer ring 104 separates O-ring 103 and grab-ring 105, primarily protecting O-ring 103 from abrasions and/or other damage that may result from grab-ring 105 during the pressing operation. Preferably, spacer ring 104 is of a sufficiently rigid material, e.g., plastic or the like, so that it protects O-ring 103 from abrasions that may result from the pressing of assembly 100. Also, spacer ring 104 may itself be an elastomer and may have different cross sections, e.g., circular, x-shaped, square, etc. Further, spacer ring 104 could be partially-seated within a groove of receiving area 106 and could further be aligned with a groove in pipe 101 and pipe 102, so that spacer ring 104 becomes partially-seated within a groove therein when in a pressed position.

Grab-ring 105 is located closest to the distal receiving end of pipe 101 within receiving area 106; accordingly, grab-ring 105 is located furthest from the interface between pipe 101 and pipe 102. Preferably, grab-ring 105 comprises a continuous ring that extends along the circumference of fitting assembly 100. As receiving area 106 is actuated from an unpressed to a pressed position, the bead diameter of receiving area 106 changes from a larger unpressed bead diameter, d, to a smaller pressed bead diameter, d'. In the unpressed position, grab-ring 105 does not extend around the entire circumference of fitting assembly 100. Instead, grab-ring 105 extends around a partial circumference of fitting assembly 100. However, as fitting assembly 100 (or receiving area 106) is actuated to a pressed position, the circumference of fitting assembly 100 decreases in proportion to the decrease of unpressed bead diameter d to pressed bead diameter d'. As this happens, the grab-ring 105 effectively slides within the decreasing circumference of fitting assembly 100 to substantially or completely span the entire circumference of fitting assembly 100 when in the final, pressed position.

Preferably, grab-ring 105 includes a continuous internal sharp edged diameter and shape such that when pressed or pressed, the outside diameter of grab-ring 105 is reduced, resulting in the continuous internal sharp edge becoming embedded into the outer surface of pipe 101 and pipe 102. Preferably, the sharp edge diameter of grab-ring 105 is defined by a first side closest to spacer 104, which according to different aspects of the present invention, is orthogonal, substantially orthogonal, or placed at a measureable angle to the surface of pipe 101 and pipe 102. The sharp edge diameter of grab-ring 105 is further defined by a second side, which forms an angle with respect to the surface of pipe 101 and pipe 102. 1. The shape of the interior surface of grab-ring 105 cone-like and centers a pipe as it is inserted into fitting assembly 100. In that way, grab-ring 105 prevents the edge of a pipe, as that pipe is inserted within fitting assembly 100, from contacting and possibly tearing the surface of O-ring 103. This reduces a documented problem in existing fittings of this type. Additional features of grab-ring 105 will be described in more detail with reference to FIGS. 3A-3C.

Figure 2:
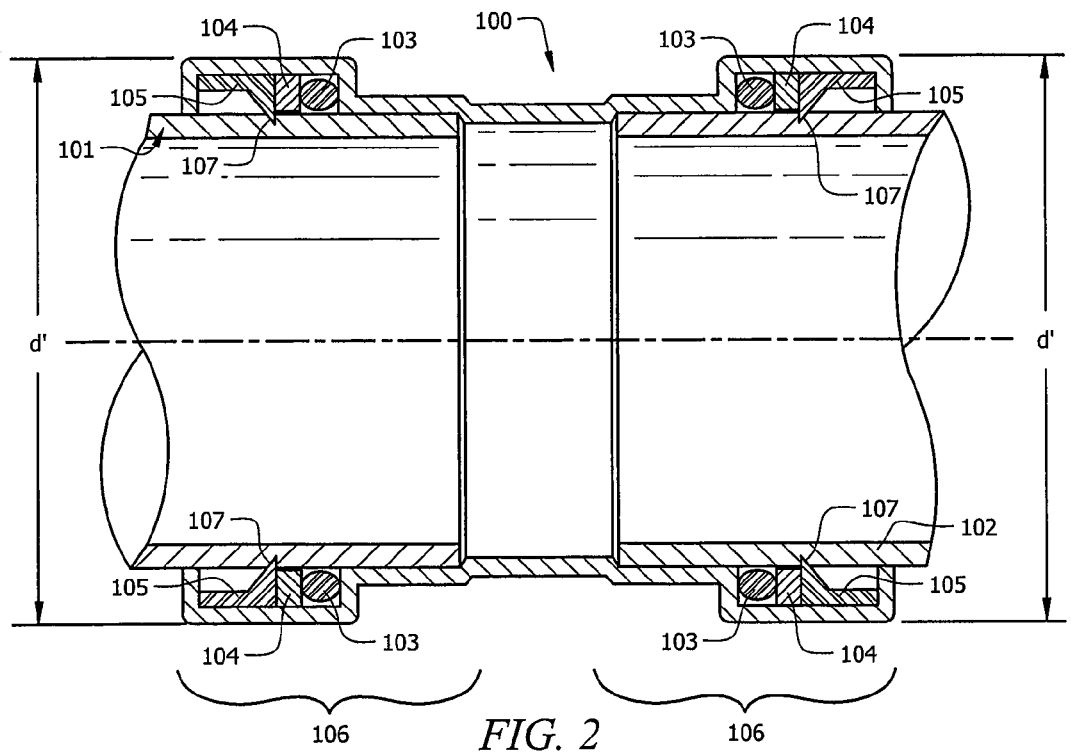
FIG. 2 is a cross-section of a fitting assembly in a pressed condition with pipes in place in accordance with the concepts described herein.

FIG. 2 depicts fitting assembly 100 and related components, pipe 101, and pipe 102 where fitting assembly 100 has been actuated to a pressed position about pipe 101 and pipe 102. As shown, the first and second distal or receiving ends of fitting assembly 100 along with receiving areas 106, have been actuated from an initial unpressed position to a final pressed position about pipe 101 and pipe 102, respectively.

In the pressed position, O-ring 103 is deformed by the pressure exerted thereupon by the outer surface of pipe 101 and pipe 102 and the inner surface of fitting assembly 100. Once deformed, O-ring 103 substantially fills the space defined by the outer surface of pipe 101, the inner surface of fitting assembly 100, and spacer 104 and the outer surface of pipe 102, the inner surface of fitting assembly 100, and spacer 104. The mechanical stress or tension created between the pipe surfaces and O-ring 103 effectively seals the joint between pipe 101 and pipe 102. Also, spacer 104 substantially fills the space defined by O-ring 103, pipe 101, pipe 102, and grab-ring 105. The flanged space along the receiving end of fitting assembly 100 that, in some part, defines receiving area 106 has decreased, whereby a greater portion of the first and second distal ends of fitting assembly 100 are adjacent to pipe 101 pipe 102, respectively. Finally, the internal sharp edged diameter of grab-ring 105 is now embedded in the outer surface of pipe 101 and pipe 102, where portion 107 represents that portion of grab-ring 105 that is embedded within pipe 101 and pipe 102 after the pressing operation.

Figure 3A:
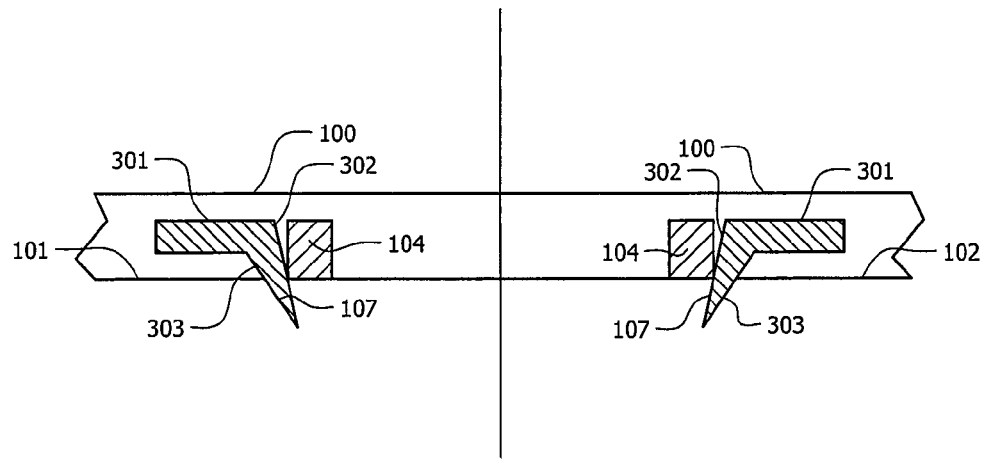
FIGS. 3A-C are cross sectional and side views of a grab-ring, or press ring, in accordance with the concepts described herein.
Figure 3B:
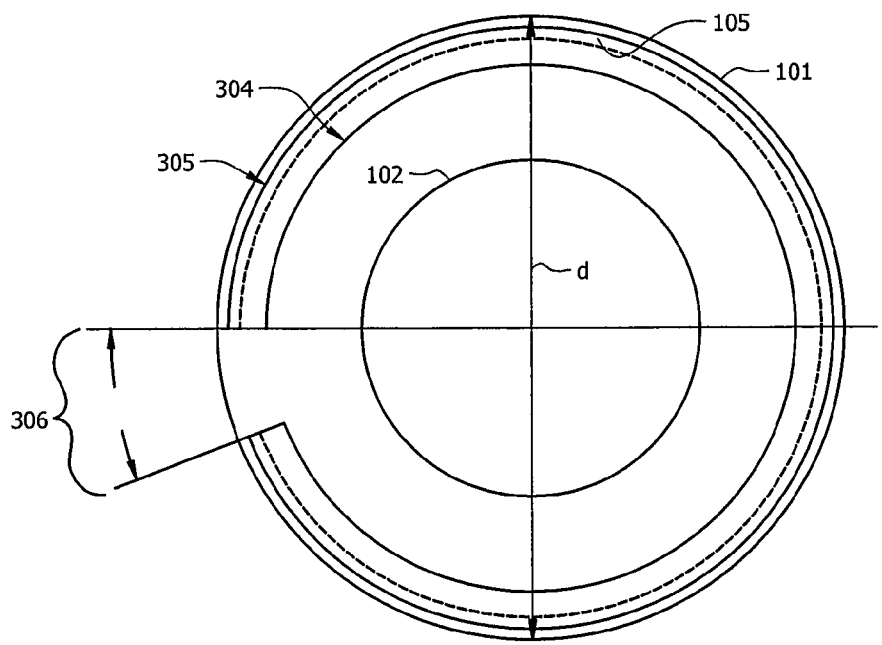
Figure 3C:
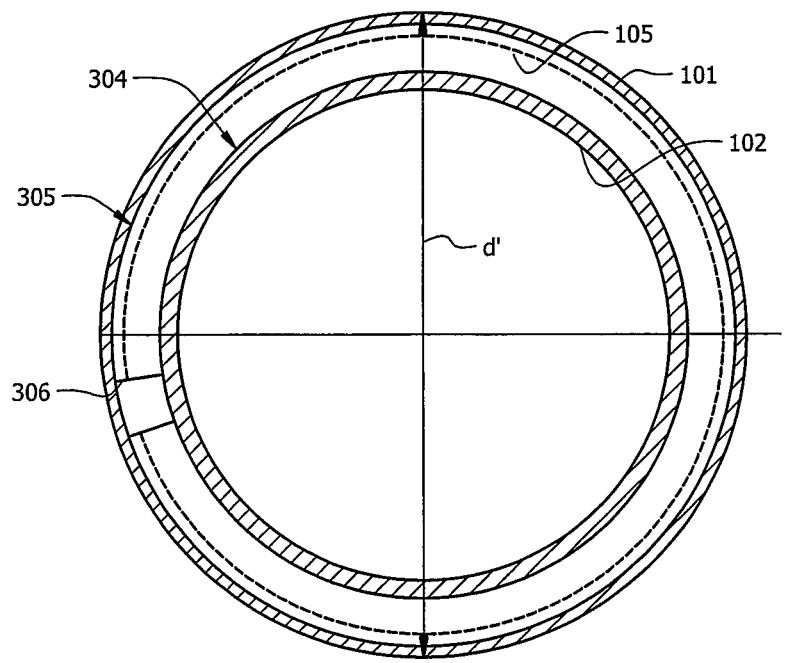

A more detailed description of grab-ring 105 is provided by references to FIGS. 3A-3C. FIG. 3A depicts a cross-section view of grab-ring 105, having surfaces 301, 302, and 303. According to embodiments of fitting assembly 100 described herein, surface 301 is adjacent to fitting assembly 100; surface 302 extends between the surface of fitting assembly 100 and the surface of pipe 101 and pipe 102. Portion 107 of grab-ring 105 corresponds to that portion embedded in each after grab-ring 105 has been actuated to a pressed position.

According to FIG. 3A, surface 302 is angled so that the inner edge of surface 302 (i.e., the edge closest to pipe 101 and pipe 102) is closest to the medial portion of fitting assembly 100 and the outer edge of surface 302 (i.e., the edge furthest from pipe 101 and pipe 102) is further from the medial portion of fitting assembly 100. This results in the sharpest edge of grab-ring 105, defined by the meeting of surfaces 302 and 303, being slanted toward the medial portion of fitting assembly 100. Having the sharpest edge of grab-ring 105 oriented towards the medial segment of fitting assembly 100 is advantageous. As pipes 101 and 102 are put under pressure, they tend to 1) push away from one another at their joint, and 2) push out toward the surface of fitting assembly 100. When this occurs, the inner sharp edge of grab-ring 105 works against the respective outward motions of pipes 101 and 102 and further digs into the surface of the pipes. Accordingly, as pipes 101 and 102 are subject to greater fluid pressure, i.e., as pipes 101 and 102 tend to push outward from their joint, portion 107 of grab-ring 105 tends to increase, thereby increasing the biasing force on pipes 101 and pipe 102 toward the medial portion of fitting assembly 100. This provides for an even more secure fitting under greater pressure.

Various angles of surface 302 are effective. Currently, it is thought that an angle of between 5 degrees and 20 degrees from an orthogonal plane extending from the surfaces of pipe 101 and 102 are the most effective. However, it should be appreciated that the specific angle of surface 302 (and the resulting sharp edge diameter of grab-ring 105) will change according to parameters, including the specific application and materials in use. For example, according to another aspect of the present invention, surface 302 is orthogonal (or substantially orthogonal) to the surface of pipe 101 and pipe 102.

Surface 303 forms an angle with respect to the surface of pipe 101 and pipe 102. Preferably, surface 303 forms a forty-five degree angle with respect to the surface of pipe 102. However, other useful embodiments are envisioned where the angle formed by surface 303 and pipe 102 is different, thought to most beneficially be between thirty five and fifty five degrees.

According to one aspect of the present invention, the sharp edge inner diameter defined by the meeting of surface 302 and 303 is of uniform diameter. That is, as previously mentioned, grab-ring 105 is preferably characterized by a continuous inner diameter (or "inner tooth"), thereby allowing more contact area between grab ring 105 and the pipe in which it is embedded. A continuous inner tooth reduces slippage between the secured pipes at low pressure and provides higher joint burst pressure. As can be seen, this feature provides for portion 107 of grab-ring 105 to be embedded by a uniform, or a least a substantially uniform amount, within the surface of pipe 101 and pipe 102. Further, grab-ring 105 is located within receiving area 106 so that, as fitting assembly 100 is pressed, surface 302 is directly below the pressing jaw of the pressing tool. This creates the most effective use of pressing force to engage the grab-105 with a secured pipe.

As mentioned above, once pressurized, pipes 101 and 102 push away from one another at their joint. This motion tends to "roll" the inner diameter of grab-ring 105 towards the open end of fitting assembly 100. Should this occur, the joint will fail. With the above in mind, according to an aspect of the present invention, surface 301 is preferably of sufficient length to provide stability to grab-ring 105 when fitting assembly 100 and a secured pipe are pressurized. Surface 301, when a preferred length, works against this rotation of the grab ring 105 at its inner diameter as pressure is applied. According to an aspect of the invention, the ratio of length of surface 301 to the length of surface 302 is 1.5 to 10. However, other ratios may be advantageous depending on variations in application and materials used.

FIG. 3B depicts a side view of grab-ring 105 in an unpressed position. Fitting assembly 100, at its distal or receiving ends, has unpressed bead diameter, d. Grab-ring 105, having inner diameter 304 and outer diameter 305, partially extends around the circumference of pipe 101. Gap 306 represents that portion of the circumference of pipe 101 that is not covered by grab-ring 105, and may be expressed in terms of, for example, degrees.

FIG. 3C depicts a side view of grab-ring 105 in a pressed position. Fitting assembly 100, at its distal or receiving ends, has pressed bead diameter, d'. Grab-ring 105 now fully extends around the circumference of fitting assembly 100, which has decreased in proportion to its diameter in changing from d to d'. During the actuation operation, gap 306 has decreased to zero or substantially zero. Accordingly, grab-ring 105 now extends about the entire circumference of pipe 102 as well. As further seen, inner sharp edged diameter 304 is now embedded in the outer surface of pipe 102. It should be appreciated that, according to other aspects of the present invention, spacer ring 104 may be continuous. In such case, spacer ring 104 will contract between an unpressed and pressed position.

Figure 4A:
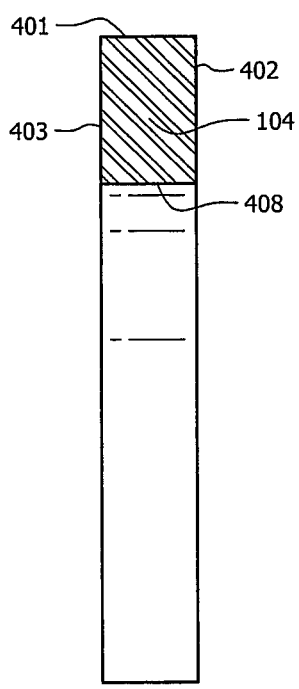
FIGS. 4A-C are cross sectional and side views of a spacer of in accordance with the concepts described herein.

FIG. 4A depicts a cross-section view of spacer ring 104, having surfaces 401, 402, 403, and 408. According to embodiments of fitting assembly 100 described herein, surface 401 is adjacent to fitting assembly 100, surface 408 is adjacent to pipe 101 or pipe 102, and surfaces 402 and 403 extend between the surfaces of fitting assembly 100 and pipe 101 or pipe 102 and are orthogonal (or substantially orthogonal) to each.

Figure 4B:
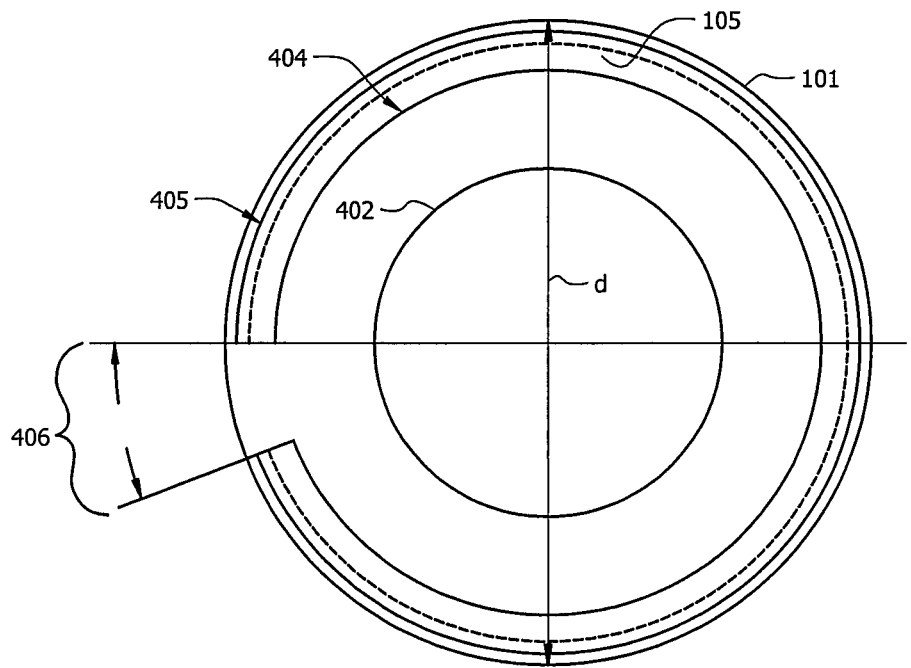

FIG. 4B depicts a side view of spacer ring 104 in an unpressed position. Fitting assembly 100, at its receiving ends, has unpressed bead diameter, d. Spacer ring 104, having inner diameter 404 and outer diameter 405, partially extends around the circumference of fitting assembly 100. Gap 406 represents that portion of the circumference of fitting assembly 100 that is not covered by spacer ring 104, and may be expressed in terms of, for example, degrees.

Figure 4C:
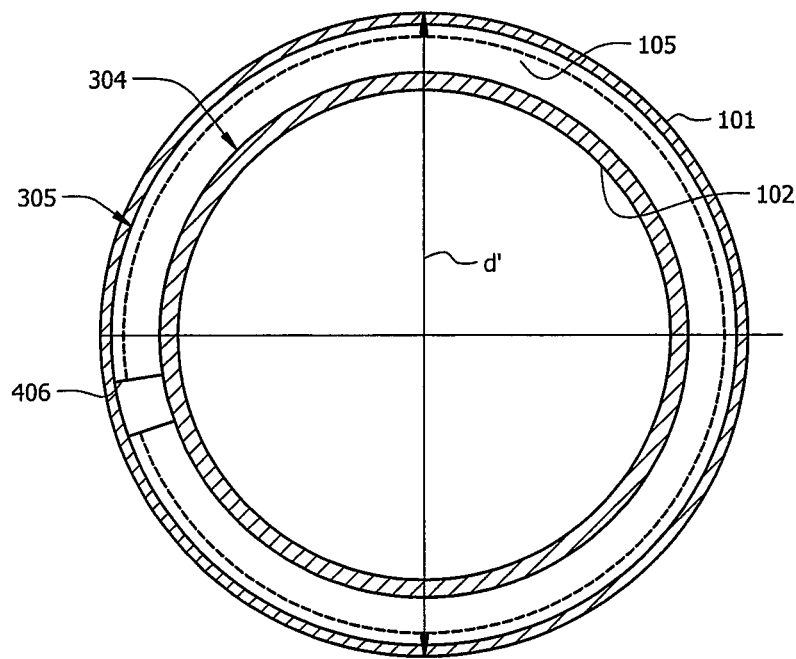

FIG. 4C depicts a side view of spacer ring 104 in a pressed position. Pipe 101, at its receiving end, has pressed bead diameter, d'. Spacer ring 104 now fully extends around the circumference of fitting assembly 100, which has decreased in proportion to its diameter in changing from d to d'. During the actuation operation, gap 406 has decreased to zero or substantially zero. Accordingly, spacer ring 104 now extends about the entire circumference of pipe 102 as well.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A fitting assembly comprising:
   a fitting having a recess in a distal end for receiving a pipe end;
   a sealing ring in the recess to provide a fluid-tight seal after the fitting is pressed;
   a grab-ring in the recess having exactly one continuous sharp inner edge to engage an outer surface of the pipe after the fitting is pressed; and
   wherein said continuous sharp inner edge is at an angle of between 5 degrees and 25 degrees from the orthogonal plane extending from the surface of the pipe end.

2. The assembly of claim 1 wherein said continuous sharp inner edge is at an angle between 10 and 20 degrees from the plane orthogonal to the surface of the pipe end.

3. The assembly of claim 1 wherein said continuous sharp inner edge is at an angle of approximately 15 degrees from the plane orthogonal to the surface of the pipe end.

4. The assembly of claim 1 wherein said continuous sharp inner edge is at an angle towards the medial section of said fitting from said orthogonal plane.

5. The assembly of claim 1 wherein said continuous sharp inner edge is uniformly embedded in said pipe end when the fitting is pressed.

6. The assembly of claim 1 further comprising a spacer between said sealing ring and said grab-ring.

7. The assembly of claim 1 wherein said continuous sharp inner edge is angled so that said grab-ring works against motion of said pipe end away from the medial section of said fitting.

8. The assembly of claim 1, wherein said grab-ring has an extended cross section that is fully engaged with a body of said fitting.

9. A method for joining a first and second pipe using a fitting, said method comprising:
   inserting a first pipe end into a fitting having a recess in a distal end, the fitting including a sealing ring in the recess and a grab-ring in the recess, the grab ring having exactly one continuous sharp inner edge; and
   pressing the fitting such that the sealing ring provides a fluid-tight seal between an inner surface of the fitting and an outer surface of the pipe end and the continuous sharp inner edge of the grab-ring engages the outer surface of the pipe end, thereby securing the pipe end to the fitting:
   wherein said continuous sharp inner edge is at an angle of between 5 degrees and 25 degrees from the orthogonal plane extending from the surface of the pipe end.

10. The method of claim 9 wherein said continuous sharp inner edge is at an angle between 10 and 20 degrees from the plane orthogonal to the surface of the pipe end.

11. The method of claim 9 wherein said continuous sharp inner edge is at an angle of approximately 15 degrees from the plane orthogonal to the surface of the pipe end.

12. The method of claim 9 wherein said continuous sharp inner edge is angled towards the medial section of said fitting from said orthogonal plane.

13. The method of claim 9 wherein said continuous sharp inner edge is uniformly embedded in said pipe end when the fitting is pressed.

14. The method of claim 9 wherein the fitting includes a spacer between said sealing ring and said grab-ring.

15. The method of claim 9 wherein said continuous sharp inner edge is angled so that said grab-ring works against motion of said pipe end away from the medial section of said fitting.

\* \* \* \* \*